May 16, 1961  E. WILLEY  2,984,039
HOOK SETTING MECHANISM FOR FISHING RODS AND POLES
Filed July 3, 1958
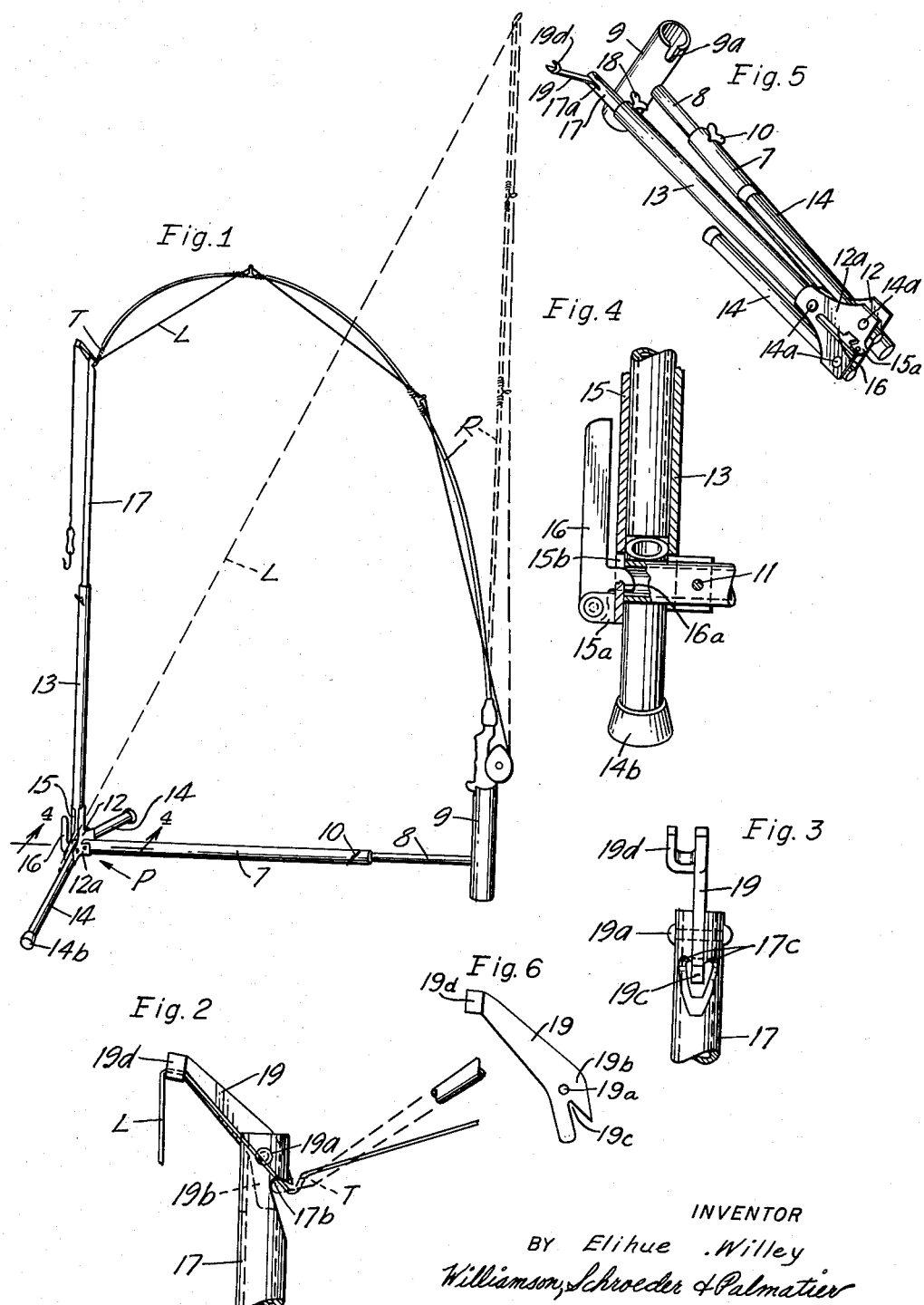
INVENTOR
BY Elihue Willey
Williamson, Schroeder & Palmatier
ATTORNEYS 2,984,039
Patented May 16, 1961

2,984,039
HOOK SETTING MECHANISM FOR FISHING RODS AND POLES

Elihue Willey, Hazen, N. Dak.

Filed July 3, 1958, Ser. No. 746,523

3 Claims. (Cl. 43—15)

This invention relates to fishing tackle and particularly to mechanism associated with a rod or pole for automatically setting the hook when a fish strikes.

It is an object of my invention to provide a simple but highly efficient device for holding a fishing rod or pole having mechanism combined therewith for releasing tension on the rod or pole when a fish strikes, to cause the inherent resiliency of the rod or pole to automatically set the hook in the striking fish.

More specifically it is an object to provide a device of the class described wherein various types of rods and poles may be adjustably retained in upright position with tension applied to the outermost portion of the rod or pole through trigger-actuated retaining mechanism and wherein the trigger mechanism is of sensitive nature and quickly responsive to a slight pull imparted by a fish which strikes or bites the lure or bait attached to the fishing line, the trigger action releasing the tensioned rod to impart an upward pull, thereby hooking the fish.

It is a further object to provide hook-setting mechanism of the class described which may be compactly collapsed for portability and shipping and which when assembled for fishing, provides a wide base and support for a rod or pole in upright position with mechanism for retaining the tip of the same in bent and tensioned position and having delicate trigger mechanism with guide means for the fishing line whereby upon a strike, the rod or pole tip is released from its tensioned position and thereby produces a sharp pull upon the line adequate to set the hook in the mouth of the striking fish.

These and other objects and advantages of my invention will more fully appear from the following description made in connection with the accompanying drawings wherein like reference characters refer to similar parts throughout the several views and in which:

Fig. 1 is a side elevation of an embodiment of the invention showing in full lines a conventional casting rod operatively held and tensioned for setting of the hook in the mouth of a striking fish and showing in dotted lines the normal or upward position of the rod after actuation of the trigger mechanism;

Fig. 2 is a detail view on an enlarged scale illustrating in side elevation the line-guiding and trigger mechanism;

Fig. 3 is a detail view on an enlarged scale showing the rear of the trigger mechanism with line-guiding means;

Fig. 4 is a detail view partly in vertical section taken on the line 4—4 of Fig. 1, of the support and pedestal showing the releasable retaining dog for securing the forward supporting legs in operative position to maintain the trigger-mounting post in erect position;

Fig. 5 is a top perspective view of said embodiment of my invention in collapsed compact position; and Fig. 6 is a detail side elevation of the trigger member detached carrying the pivot pin.

In the form of my invention illustrated, I provide a collapsible pedestal or stand indicated as an entirety by the letter P, comprising a rigid horizontal beam 7 which may be of tubular metal which as shown, has adjustably telescoped therein a smaller tubular rod 8 which at its rear or outer end rigidly carries an upstanding socket 9 for reception of the butt or handle of a fishing rod or pole and having as shown, a notch 9a formed in the forward upper portion thereof for accommodation of the finger piece or grip which in conventional casting rods, is disposed on the underside of the handle. A set screw preferably manipulated by a wing bolt 10 is provided in the tubular beam 7 for securing the telescoped tube 8 in a desired adjusted position with socket 9 disposed vertically.

The forward end of the tubular beam 7 as shown, is hingedly connected by a pivot pin 11 with a rearwardly extending lug 12a rigidly and as shown, integrally constructed with a rear connector member 12 of inverted T-shape (see Figs. 1 and 5) which collapsibly interconnects an upstanding trigger mounting post 13 with a pair of collapsible forward pedestal legs 14. Connector member 12 cooperates with a forward connector member 15 of generally similar shape and positioned oppositely to member 12 to clamp the lower end of the upstanding trigger-mounting post which as shown, is in the form of a metal tube while providing at the inverted T-head hinge mounting for the two rigid pedestal legs 14. Pivotal connection to the respective legs 14 is made by large rivets or equivalent pivot pin elements 14a and as shown, the legs 14 have rubber or other equivalent non-abrasive feet 14b at the outer ends thereof for engagement with ice, a dock or other supporting medium to be utilized in fishing.

The hinged relation of the tubular pedestal beam 7 with lug 12a of the connector medium comprising parts 12 and 15 enables the beam to be swung as shown in Fig. 5 in contiguous compact relation with the upstanding mounting post 13 and after such collapsing of beam 7 the pedestal legs 14 may be also swung upwardly on the pivot pins 14a to dispose the same in close relation to the sides of post 13.

To lock the pedestal legs and horizontal beam 7 in operative position as well as in collapsed, portable position, I provide as shown a locking dog 16 pivoted to a forwardly extending lug 15a integrally formed or rigidly connected with the lower central portion of the forward connector member 15.

Locking dog 16 as clearly shown in Figs. 4 and 5 is swingable in a vertical plane and rigidly carries the locking tooth 16a adjacent the pivoted end thereof which is accommodated in a slot 15b centrally formed in the lower portion of front connector member 15 just above lug 15a and which is located between the inner pivoted ends of legs 14 when the same are operatively positioned in substantially horizontal relation.

The trigger-mounting post 13 as shown, has adjustably telescoped therein a tubular trigger-supporting member 17 for vertical adjustment relatively to the post and a wing-nut set screw 18 is threadedly mounted within the upper portion of post 13 for engagement against the trigger support member 17 to maintain the latter in the desired vertically adjusted position.

The trigger supporting member 17 shown of tubular construction, is bifurcated at the upper end thereof to form a slot 17a for accommodating a trigger plate 19 pivoted by a pin 19a to the head of support 17. Trigger plate 19 may be constructed from a strip of suitable metal having the body thereof planar with an enlarged pivoted end 19b having a diagonal slot 19c formed therein for registry and alignment with a retaining notch 17b formed in the rear side of the trigger-supporting member 17 just below the head or upper end thereof. I prefer in forming said retaining slot 17b to cause the upper retaining shoulders 17c formed therein to converge inwardly to efficiently retain a pole or rod tip T under tension.

The trigger plate 19 at its outer end is first offset and then bent or otherwise formed to provide a U-shaped line guide 19d which is disposed at one side of the trigger supporting member 17 to facilitate accommodation of a fishing line extending past the tip of the rod or pole. It will be observed that the forward side of the slot 19c is formed in the pivoted portion of the trigger plate is presented obliquely to the retaining notch 17b to cause a natural outward camming action when the forward or projecting end of trigger plate 19 is swung downwardly as through the force of a striking fish upon the line.

From the foregoing description taken with the accompanying drawings, it will be noted that the stationary and upstanding supporting member 17 with its retaining slot 17b combines in the embodiment shown with the trigger plate 19 to constitute a trigger-latching means for positively retaining rod R in the bowed or tensioned position and for positively releasing the engaged portion of the rod when a pull is imparted upon the line guide 19d. The entire latch mechanism is supported independently of the rod or tension on the rod.

*Operation*

In use the distance between the pedestal supports including the legs 14 and the butt-supporting socket 9 is adjusted by sliding action of the telescoped section 8 and clamping by set screw 10 to retain the rod or pole in proper spaced relation to the trigger-mounting post for reception and retaining of the tensioned tip of the rod or pole in the trigger mechanism. To this end, it is also important to adjust the trigger supporting member 17 vertically within the trigger-mounting post 13 so that the retaining notch 17b is at proper height for precisely receiving and holding the tensioned tip of the rod or pole.

Fig. 1, in full lines, shows a conventional casting rod R having the handle or butt retained in socket 9 with the rod and tip tensioned and the tip guide T seated and held in the retaining notch 17b and also in the rear end of the slot 19c. The line L between the tip guide T and the outer portion thereof is guided over the U-shaped guide 19d and thereafter extends downwardly into the water which is being fished, a conventional hook, plug or lure being applied by leader or connector to the outer end of the line at the desired depth below the surface of the water (not shown).

The locking of the rod or pole tip T in notch 17b and slot 19c of the trigger mechanism retains the trigger plate 19 in the upraised position shown in the drawings.

When a fish strikes the bait or lure, exerting a downward pull thereon the trigger mechanism is immediately responsive, the pull swinging trigger plate downwardly and thereby immediately camming the tip of the pole or rod out of engagement with retaining notch 17b whereupon the bowed or tensioned outer portion of the rod springs upwardly, imparting a fast upward pull upon the line and thereby setting the hook forcibly in the mouth or lips of the striking fish.

In such trigger action, the movement of the rod and line and the sound caused by the release of tension of the rod warn the angler even though he may be some distance away, of the strike and he may then grasp his rod or pole removing the same upwardly from the socket 9 and then retrieve the fish in normal fashion without any encumbrance from the rod holder and trigger mechanism. When the rod is lifted, the line slips upwardly out of engagement from the line guide 19d of the trigger mechanism.

By providing for widely varying spaced relation between the pedestal legs 14 and the rod socket 9 and by also providing for wide vertical adjustment between the head of the trigger-supporting member 17 and its mounting post 13, I am able to adapt my device to a wide range of rod and pole lengths conventionally used in fishing.

To collapse the entire device in a very compact form for portability or shipment, the pivoted dog 16 is swung forwardly releasing its tooth 16a. Thereafter the pedestal beam 7 is swung upwardly in contiguous relation with the trigger mounting post 13 and thereafter the pedestal legs 14 are swung upwardly on their pivots 14a into adjacent relationship with post 13. Set screws 10 and 18 are of course tightened to prevent inadvertent longitudinal movement of the telescoped members 8 and 17 and socket 9 is preferably swung through 90 degrees from the operating position to more compactly nest the entire device.

When collapsed, the beam 7 and the legs 14 are retained in the nested or collapsed position by swinging the dog 16 inwardly towards the forward connector plate 15.

From the foregoing description, it will be seen that I have provided a simple, light and highly efficient device for utilizing the conventional fishing rods and poles with fishing line thereon to automatically set the hook in the fish's mouth when a fish strikes the lure or bait. It will further be seen that with my structure and the adjustments provided thereby, poles and rods of various lengths and resiliency may be efficiently accommodated and properly retained at their tips to uniformly obtain my improved results.

My device is particularly well adapted for ice fishing, dock or shore fishing and enables the fisherman to be removed some distance from his tackle while nevertheless automatically hooking a striking fish and subsequently retrieving the same.

It will of course be understood that various changes may be made in the form, details, arrangement and proportions of the parts without departing from the scope of my invention.

What is claimed is:

1. A collapsible hook-setting device for fishing-rod and pole media having in combination a pedestal structure including an upwardly extending mounting post, a pair of legs hingedly connected to the lower portion of said post for substantially horizontal support positioning extending outwardly in opposite directions from said post, and for collapsed positioning adjacent and substantially parallel to said post, an elongated connector member also hingedly connected to said post for collapsing substantially parallel to said post and for positioning operatively in substantially horizontal relation rearwardly of said post, the outer or free end of said connector member carrying a socket for receiving the butt or lower portion of said fishing medium in horizontally spaced relation to said mounting member, said mounting post adjacent the upper end thereof having means for receiving and releasably retaining the tip of the fishing medium when the upper portion of said medium is bent and tensioned, a line-actuated trigger element shiftably connected to the upper portion of said mounting member and having line-guiding means adjacent one end and having an ejection portion disposed adjacent said tip-retaining means for ejecting said tip when a tug is imparted to the line by striking of a fish.

2. The structure set forth in claim 1 further characterized by a releasable locking element associated with the hinged connection between said mounting post, said legs and said connector member to secure said parts in extended operating position and to also retain said parts in the predefined collapsed relation.

3. The structure set forth in claim 1 wherein said mounting post comprises two slidably connected and longitudinally collapsible sections and wherein said connector member also comprises two slidably connected and longitudinally collapsible sections.

References Cited in the file of this patent

UNITED STATES PATENTS

| | | |
|---|---|---|
| 1,957,853 | Sibley | May 8, 1934 |
| 2,197,912 | Spitz et al. | Oct. 31, 1939 |
| 2,799,111 | Voboril | July 16, 1957 |
| 2,803,911 | Hollingsworth | Aug. 27, 1957 |